(12) United States Patent
Feist et al.

(10) Patent No.: US 7,179,551 B2
(45) Date of Patent: *Feb. 20, 2007

(54) POLY(ARYLENE ETHER) DATA STORAGE MEDIA

(75) Inventors: Thomas Paul Feist, Clifton Park, NY (US); Kevin Hsingtao Dai, Clifton Park, NY (US); Glen David Merfeld, Loudonville, NY (US)

(73) Assignee: General Electric Company, Schenectady, NY (US)

( * ) Notice: Subject to any disclaimer, the term of this patent is extended or adjusted under 35 U.S.C. 154(b) by 509 days.

This patent is subject to a terminal disclaimer.

(21) Appl. No.: 10/063,004

(22) Filed: Mar. 11, 2002

(65) Prior Publication Data

US 2002/0094455 A1   Jul. 18, 2002

Related U.S. Application Data

(63) Continuation-in-part of application No. 09/683,114, filed on Nov. 20, 2001, now abandoned, which is a continuation of application No. 09/502,968, filed on Feb. 11, 2000, now abandoned.

(60) Provisional application No. 60/146,248, filed on Jul. 29, 1999, provisional application No. 60/134,585, filed on May 17, 1999, provisional application No. 60/137,884, filed on Jun. 7, 1999, provisional application No. 60/137,883, filed on Jun. 7, 1999, provisional application No. 60/120,101, filed on Feb. 12, 1999.

(51) Int. Cl.
  *G11B 5/73*   (2006.01)
(52) U.S. Cl. .............. 428/847.1; 428/848.2; 428/848.3; 428/848.6; 428/848.8; 428/848.9; 428/64.4; 428/64.7

(58) Field of Classification Search .............. 428/64.2, 428/64.3, 64.4, 65.3, 66.7, 323, 411.1, 500; 525/132, 905, 152; 528/86
See application file for complete search history.

(56) References Cited

U.S. PATENT DOCUMENTS

| 3,198,657 | A | 8/1965 | Kimball et al. ............. 117/101 |
| 4,020,278 | A | 4/1977 | Carre et al. ................. 358/128 |

(Continued)

FOREIGN PATENT DOCUMENTS

CA   1323697   10/1993

(Continued)

OTHER PUBLICATIONS

"Plastics Materials", 7th Ed., pp. 584-592.*

(Continued)

*Primary Examiner*—Kevin M. Bernatz
(74) *Attorney, Agent, or Firm*—Cantor Colburn LLP

(57) ABSTRACT

A storage media comprises: a substrate comprising a plastic resin portion, wherein to plastic resin portion comprises poly(arylene ether) and a styrene material selected from the group consisting of polystyrene, styrenic copolymer(s), and reaction products and combinations comprising at least one of the foregoing styrene material(s), and a data layer on the substrate. The data layer can be at least partly read from, written to, or a combination thereof by an energy field. Additionally, when the energy field contacts the storage media, the energy field is incident upon the data layer before it could be incident upon the substrate.

41 Claims, 4 Drawing Sheets

U.S. PATENT DOCUMENTS

| | | | |
|---|---|---|---|
| 4,057,831 A | 11/1977 | Jacobs et al. | |
| 4,206,256 A | 6/1980 | Matthies et al. | |
| 4,211,617 A | 7/1980 | Hunyar et al. | 204/5 |
| 4,222,070 A | 9/1980 | Howe et al. | |
| 4,235,835 A | 11/1980 | Stutzman et al. | 264/328.2 |
| 4,243,317 A | 1/1981 | Garbe et al. | 355/91 |
| 4,267,212 A | 5/1981 | Sakawaki | 427/240 |
| 4,272,474 A | 6/1981 | Crocker | 264/176 R |
| 4,305,081 A | 12/1981 | Spong | |
| 4,329,697 A | 5/1982 | Bell | |
| 4,363,844 A | 12/1982 | Lewis et al. | 428/65 |
| 4,373,065 A | 2/1983 | Prest, Jr. | |
| 4,402,798 A | 9/1983 | Gorog et al. | |
| 4,404,238 A | 9/1983 | Baldwin | |
| 4,415,942 A | 11/1983 | Frosch et al. | |
| 4,419,704 A | 12/1983 | Radman et al. | |
| 4,430,387 A | 2/1984 | Nakagawa et al. | |
| 4,441,179 A | 4/1984 | Slaten | |
| 4,451,507 A | 5/1984 | Beltz et al. | 427/240 |
| 4,457,259 A | 7/1984 | Samuels | 118/705 |
| 4,492,718 A | 1/1985 | Mayer et al. | |
| 4,503,420 A | 3/1985 | Rub et al. | |
| 4,514,583 A | 4/1985 | Izu et al. | 136/259 |
| 4,515,828 A | 5/1985 | Economy | |
| 4,519,065 A | 5/1985 | Lewis et al. | 369/275 |
| 4,552,820 A | 11/1985 | Lin et al. | |
| 4,554,655 A | 11/1985 | Kumasaka et al. | |
| 4,569,871 A | 2/1986 | Ohmori et al. | |
| 4,584,259 A | 4/1986 | Mayer et al. | |
| 4,590,493 A | 5/1986 | Inoue et al. | |
| 4,592,939 A | 6/1986 | Temple et al. | 428/64 |
| 4,596,739 A | 6/1986 | Piltingsrud et al. | |
| 4,596,740 A | 6/1986 | Tsukane | |
| 4,619,804 A | 10/1986 | Leonard et al. | |
| 4,622,284 A | 11/1986 | West et al. | |
| 4,656,546 A | 4/1987 | Mallory | |
| 4,658,392 A | 4/1987 | Langowski et al. | |
| 4,659,407 A | 4/1987 | Lacotte et al. | 156/196 |
| 4,659,605 A | 4/1987 | Malik et al. | |
| 4,673,602 A | 6/1987 | Nakayama et al. | 428/65 |
| 4,678,547 A | 7/1987 | Miyamoto et al. | |
| 4,690,846 A | 9/1987 | Wada et al. | |
| 4,698,716 A | 10/1987 | Lazzari | |
| 4,705,566 A | 11/1987 | Senda et al. | |
| 4,708,919 A | 11/1987 | Shimkunas et al. | |
| 4,709,361 A | 11/1987 | Dahlstrom et al. | |
| 4,719,171 A | 1/1988 | Ikenaga et al. | |
| 4,726,998 A | 2/1988 | Ikenaga et al. | |
| 4,731,155 A | 3/1988 | Napoli et al. | 156/643 |
| 4,737,877 A | 4/1988 | Krongelb et al. | |
| 4,741,689 A | 5/1988 | Onizawa et al. | |
| 4,742,420 A | 5/1988 | Oishi | 360/135 |
| 4,775,608 A | 10/1988 | Baum et al. | |
| 4,789,722 A * | 12/1988 | Jabloner et al. | 528/172 |
| 4,808,455 A | 2/1989 | Wada et al. | |
| 4,809,110 A | 2/1989 | Hertrich | |
| 4,810,527 A | 3/1989 | Geary, Jr. et al. | 427/54.1 |
| 4,816,351 A | 3/1989 | Takagi et al. | 428/694 |
| 4,825,680 A | 5/1989 | Coe et al. | |
| 4,831,244 A | 5/1989 | Slafer et al. | 235/487 |
| 4,835,909 A | 6/1989 | Richter et al. | |
| 4,839,244 A | 6/1989 | Tsukamoto | |
| 4,841,501 A | 6/1989 | Izuka et al. | |
| 4,845,142 A | 7/1989 | Niwano et al. | |
| 4,851,455 A * | 7/1989 | Job et al. | 522/139 |
| 4,851,494 A | 7/1989 | Eldin et al. | 528/170 |
| 4,870,429 A | 9/1989 | Fujita et al. | 346/137 |
| 4,876,117 A | 10/1989 | Bornstein | |
| 4,877,666 A | 10/1989 | Muchnik et al. | |
| 4,885,339 A * | 12/1989 | Traugott et al. | 525/132 |
| 4,885,649 A | 12/1989 | Das | |
| 4,893,910 A | 1/1990 | Birecki | |
| 4,896,292 A | 1/1990 | Eich et al. | |
| 4,902,746 A | 2/1990 | Serini et al. | |
| 4,908,826 A | 3/1990 | Hertrich | |
| 4,911,966 A | 3/1990 | Murayama et al. | |
| 4,911,967 A | 3/1990 | Lazzari | |
| 4,920,441 A | 4/1990 | Kimura et al. | |
| 4,923,942 A | 5/1990 | Takeyama et al. | |
| 4,925,738 A | 5/1990 | Tsuya et al. | |
| 4,931,147 A | 6/1990 | Legierse et al. | |
| 4,953,385 A | 9/1990 | Aoki et al. | |
| 4,956,015 A | 9/1990 | Okajima et al. | |
| 4,964,934 A | 10/1990 | Gregg | |
| 4,965,780 A | 10/1990 | Lee et al. | |
| 4,971,932 A | 11/1990 | Alpha et al. | |
| 4,975,327 A | 12/1990 | Somasiri et al. | 428/409 |
| 4,975,358 A | 12/1990 | Sonnenschein et al. | |
| 4,976,902 A | 12/1990 | Oberle | 264/54 |
| 4,983,335 A | 1/1991 | Matsuo et al. | |
| 4,985,306 A | 1/1991 | Morizane et al. | |
| 4,986,938 A | 1/1991 | Izuka et al. | |
| 4,987,020 A | 1/1991 | Bonnebat et al. | 428/64 |
| 4,996,622 A | 2/1991 | Takatsuki et al. | |
| 4,999,234 A | 3/1991 | Cowan | |
| 5,002,706 A | 3/1991 | Yamashita | |
| 5,014,259 A | 5/1991 | Goldberg et al. | |
| 5,018,128 A | 5/1991 | Goldberg | |
| 5,018,962 A | 5/1991 | Kitamura et al. | |
| 5,047,274 A | 9/1991 | Tsuya et al. | |
| 5,059,473 A | 10/1991 | Takahashi et al. | |
| 5,063,096 A | 11/1991 | Kohara et al. | |
| 5,063,097 A | 11/1991 | Hirota et al. | 428/65 |
| 5,068,065 A | 11/1991 | Maus et al. | |
| 5,074,971 A | 12/1991 | Tsuya et al. | |
| 5,078,947 A | 1/1992 | Nishizawa et al. | 264/1.1 |
| 5,082,696 A | 1/1992 | Sharp | 427/255 |
| 5,082,728 A | 1/1992 | Miyake et al. | |
| 5,084,355 A | 1/1992 | Takahashi et al. | |
| 5,087,340 A | 2/1992 | Onagi et al. | |
| 5,087,481 A | 2/1992 | Chen et al. | |
| 5,091,225 A | 2/1992 | Goto | |
| 5,093,174 A | 3/1992 | Suzuki et al. | |
| 5,094,796 A | 3/1992 | Katoh et al. | 264/313 |
| 5,094,884 A | 3/1992 | Hillman et al. | 427/240 |
| 5,094,925 A | 3/1992 | Ise et al. | |
| 5,096,563 A | 3/1992 | Yoshizawa et al. | |
| 5,097,370 A | 3/1992 | Hsia | |
| 5,100,741 A | 3/1992 | Shimoda et al. | |
| 5,106,553 A | 4/1992 | Onisawa et al. | |
| 5,108,781 A | 4/1992 | Ranjan et al. | |
| 5,109,377 A | 4/1992 | Yamamoto et al. | |
| 5,112,662 A | 5/1992 | Ng | |
| 5,112,701 A | 5/1992 | Katsuragawa | |
| 5,118,771 A | 6/1992 | Inoue et al. | |
| 5,119,259 A | 6/1992 | Kikuchi | 360/135 |
| 5,120,603 A | 6/1992 | Schmidt | |
| 5,128,922 A | 7/1992 | Inui et al. | |
| 5,130,356 A | 7/1992 | Feuerherd et al. | |
| 5,131,977 A | 7/1992 | Morizane et al. | |
| 5,135,791 A | 8/1992 | Imai et al. | |
| 5,137,617 A | 8/1992 | Helfet et al. | |
| 5,137,991 A | 8/1992 | Epstein et al. | |
| 5,143,797 A | 9/1992 | Hashima et al. | |
| 5,159,511 A | 10/1992 | Das | |
| 5,161,134 A | 11/1992 | Lee | |
| 5,164,465 A | 11/1992 | Epstein et al. | |
| 5,166,014 A | 11/1992 | Ledieu | |
| 5,171,585 A | 12/1992 | Onisawa et al. | |
| 5,177,656 A | 1/1993 | Hughes | |
| 5,178,926 A | 1/1993 | Tanaka et al. | |
| 5,188,863 A | 2/1993 | de Graaf et al. | 427/512 |
| 5,191,563 A | 3/1993 | Lee et al. | |
| 5,193,039 A | 3/1993 | Smith et al. | |

| | | | | | | |
|---|---|---|---|---|---|---|
| 5,199,090 A | 3/1993 | Bell | | 5,669,995 A | 9/1997 | Hong |
| 5,202,880 A | 4/1993 | Lee et al. | | 5,681,635 A | 10/1997 | Nelson et al. |
| 5,209,837 A | 5/1993 | Tsuya et al. | | 5,688,574 A | 11/1997 | Tamura et al. ............ 428/64.1 |
| 5,226,955 A | 7/1993 | Owaki et al. | | 5,689,480 A | 11/1997 | Kino |
| 5,230,025 A | 7/1993 | Fishbine et al. | | 5,691,256 A | 11/1997 | Taguchi et al. |
| 5,234,717 A | 8/1993 | Matsuno et al. | | 5,707,705 A | 1/1998 | Nelson et al. |
| 5,237,548 A * | 8/1993 | Muchnik ................ 369/13.35 | | 5,723,033 A | 3/1998 | Weiss |
| 5,242,630 A | 9/1993 | Nuij et al. .................... 264/1.3 | | 5,726,108 A | 3/1998 | Taguchi et al. |
| 5,242,761 A | 9/1993 | Uchiyama | | 5,729,393 A | 3/1998 | Lee et al. |
| 5,267,112 A | 11/1993 | Batra et al. | | 5,730,922 A | 3/1998 | Babb et al. ................. 264/258 |
| RE34,506 E | 1/1994 | Dobbin et al. | | 5,741,403 A | 4/1998 | Tenhover et al. ........ 204/192.2 |
| 5,276,098 A | 1/1994 | Kohara et al. | | 5,751,452 A | 5/1998 | Tanaka et al. |
| 5,292,550 A | 3/1994 | Fujii et al. .................. 427/165 | | 5,772,905 A | 6/1998 | Chou .......................... 216/44 |
| 5,296,528 A | 3/1994 | Lütjens et al. | | 5,781,526 A | 7/1998 | Nishizawa ............... 369/275.3 |
| 5,309,303 A | 5/1994 | Hsia et al. | | 5,789,756 A | 8/1998 | Guzik |
| 5,311,376 A | 5/1994 | Joan et al. | | 5,800,895 A | 9/1998 | Vygovsky et al. |
| 5,335,526 A | 8/1994 | Garrison, deceased et al. . 72/47 | | 5,800,904 A | 9/1998 | Hallman et al. ............ 428/156 |
| 5,354,517 A | 10/1994 | Yamasaki et al. | | 5,804,017 A | 9/1998 | Hector |
| 5,354,985 A | 10/1994 | Quate | | 5,807,498 A | 9/1998 | Gibbons et al. |
| 5,366,542 A | 11/1994 | Yamada et al. | | 5,808,830 A | 9/1998 | Stefansky et al. |
| 5,374,462 A * | 12/1994 | Funaki et al. ............... 428/65.3 | | 5,811,182 A | 9/1998 | Weir et al. |
| 5,379,439 A | 1/1995 | Harrison et al. | | 5,814,400 A | 9/1998 | Kirino et al. |
| 5,391,522 A | 2/1995 | Goto et al. | | 5,820,769 A | 10/1998 | Chou |
| 5,392,263 A | 2/1995 | Watanabe et al. | | 5,831,309 A | 11/1998 | Englisch et al. |
| 5,395,803 A | 3/1995 | Adams ....................... 437/229 | | 5,838,654 A | 11/1998 | Kagawa et al. .......... 369/275.1 |
| 5,400,317 A | 3/1995 | Strasser et al. | | 5,846,280 A | 12/1998 | Speit |
| 5,409,756 A | 4/1995 | Ikeda et al. .................... 428/64 | | 5,846,627 A | 12/1998 | Hong |
| 5,426,632 A | 6/1995 | Murakami et al. | | 5,855,746 A | 1/1999 | Prabhakara et al. |
| 5,426,638 A | 6/1995 | Murakaml et al. | | 5,855,951 A | 1/1999 | Nelson et al. |
| 5,427,599 A | 6/1995 | Greschner et al. ............ 65/305 | | 5,859,833 A | 1/1999 | Chatterjee et al. |
| 5,436,113 A | 7/1995 | Tauji et al. | | 5,866,489 A | 2/1999 | Yamaguchi |
| 5,437,887 A | 8/1995 | Yarkosky et al. | | 5,868,953 A | 2/1999 | Maekawa et al. |
| 5,441,788 A | 8/1995 | Bloomquist et al. | | 5,871,654 A | 2/1999 | Mannami et al. |
| 5,447,767 A | 9/1995 | Tanabe et al. .............. 428/64.4 | | 5,874,376 A | 2/1999 | Taguchi et al. |
| 5,452,282 A | 9/1995 | Abraham ..................... 369/603 | | 5,875,083 A | 2/1999 | Oniki et al. |
| 5,453,168 A | 9/1995 | Nelson et al. | | 5,879,578 A | 3/1999 | Chung et al. |
| 5,453,961 A | 9/1995 | Brazas | | 5,900,126 A | 5/1999 | Nelson et al. |
| 5,468,324 A | 11/1995 | Hong | | 5,900,318 A | 5/1999 | Yanagisawa |
| 5,469,312 A | 11/1995 | Watanabe et al. | | 5,902,172 A | 5/1999 | Utashiro |
| 5,470,627 A | 11/1995 | Lee et al. | | 5,907,448 A | 5/1999 | Watanabe et al. |
| 5,489,774 A | 2/1996 | Akamine et al. | | 5,911,943 A | 6/1999 | Minghetti et al. .......... 264/516 |
| 5,490,131 A | 2/1996 | Ohta et al. | | 5,948,495 A | 9/1999 | Stanish et al. |
| 5,493,454 A | 2/1996 | Ziperovich et al. | | 5,967,030 A | 10/1999 | Blalock ...................... 100/211 |
| 5,504,638 A | 4/1996 | Kinoshita et al. ......... 360/98.08 | | 5,968,627 A | 10/1999 | Nigam et al. .............. 428/65.3 |
| 5,510,164 A | 4/1996 | Best et al. | | 5,972,461 A | 10/1999 | Sandstrom ................. 428/64.3 |
| 5,515,346 A | 5/1996 | Watanabe et al. | | 5,981,015 A | 11/1999 | Zou et al. |
| 5,516,899 A | 5/1996 | Campbell et al. | | 5,987,004 A | 11/1999 | Suwabe ...................... 369/290 |
| 5,532,192 A | 7/1996 | Adams ....................... 437/229 | | 6,010,761 A | 1/2000 | Tatewaki et al. ........... 428/64.1 |
| 5,533,001 A | 7/1996 | Watanabe et al. | | 6,027,801 A | 2/2000 | Maro et al. .................. 428/332 |
| 5,533,002 A | 7/1996 | Abraham ................. 369/275.3 | | 6,030,681 A | 2/2000 | Czubarow et al. |
| 5,536,549 A | 7/1996 | Nelson et al. | | 6,055,140 A | 4/2000 | Marchon |
| 5,537,034 A | 7/1996 | Lewis | | 6,062,133 A | 5/2000 | Blalock ...................... 100/211 |
| 5,538,774 A | 7/1996 | Landin et al. | | 6,094,413 A | 7/2000 | Guerra .................... 369/275.1 |
| 5,552,009 A | 9/1996 | Zager et al. ................. 156/220 | | RE36,806 E | 8/2000 | Landin et al. ............. 428/64.1 |
| 5,561,089 A | 10/1996 | Ishizaki et al. | | 6,096,419 A | 8/2000 | Ito et al. ..................... 428/336 |
| 5,567,217 A | 10/1996 | Goto et al. | | 6,127,017 A * | 10/2000 | Hirata et al. ............... 428/64.1 |
| 5,582,891 A | 12/1996 | Murakami et al. | | 6,136,401 A | 10/2000 | Yamamoto et al. ........ 428/64.1 |
| 5,583,705 A | 12/1996 | Ziperovich et al. | | 6,146,755 A | 11/2000 | Guha et al. ................. 428/332 |
| 5,585,159 A | 12/1996 | Miyake et al. | | 6,154,438 A | 11/2000 | O'Hollaren et al. ...... 369/275.3 |
| 5,585,989 A | 12/1996 | Kuromiya et al. | | 6,156,422 A | 12/2000 | Wu et al. .................... 428/332 |
| 5,590,115 A | 12/1996 | Kubo | | 6,165,391 A | 12/2000 | Vedamuttu ................. 264/1.33 |
| 5,591,501 A | 1/1997 | Ovshinsky et al. ........ 428/64.1 | | 6,183,829 B1 | 2/2001 | Daecher et al. ............ 428/64.1 |
| 5,609,990 A | 3/1997 | Ha et al. | | 6,191,053 B1 | 2/2001 | Chun et al. ................. 438/780 |
| 5,622,816 A | 4/1997 | Maenza et al. | | 6,194,045 B1 | 2/2001 | Annacone et al. ......... 428/64.1 |
| 5,626,886 A | 5/1997 | Ishii ........................... 425/116 | | 6,200,633 B1 | 3/2001 | Kitano et al. ............... 427/240 |
| 5,626,920 A | 5/1997 | Weir et al. | | 6,207,095 B1 | 3/2001 | Gosetti ....................... 264/250 |
| 5,626,935 A | 5/1997 | Goto et al. | | 6,214,429 B1 | 4/2001 | Zou et al. ................... 428/64.1 |
| 5,629,417 A | 5/1997 | Campbell et al. | | 6,225,240 B1 | 5/2001 | You et al. ................... 438/782 |
| 5,635,269 A | 6/1997 | Weir et al. | | 6,232,247 B1 | 5/2001 | Gordon et al. ............. 438/780 |
| 5,639,588 A | 6/1997 | Huh | | 6,236,542 B1 | 5/2001 | Hartog et al. |
| 5,657,304 A | 8/1997 | Lehureau .................... 369/109 | | 6,248,395 B1 | 6/2001 | Homola et al. ............. 427/129 |
| 5,663,016 A | 9/1997 | Hong | | 6,328,920 B1 | 12/2001 | Uchiyama et al. ......... 264/255 |
| 5,666,237 A | 9/1997 | Lewis | | 6,335,843 B2 | 1/2002 | Yotsuya et al. ............... 360/60 |

| | | | |
|---|---|---|---|
| 6,347,016 B1 | 2/2002 | Ishida et al. | |
| RE37,599 E * | 3/2002 | Lau et al. | 528/401 |
| 6,411,457 B2 | 6/2002 | Yamashita et al. | 360/73.03 |
| 6,433,964 B1 | 8/2002 | Chang | 360/133 |
| 6,492,035 B1 | 12/2002 | Yamaguchi et al. | 428/611 |
| 6,544,667 B1 | 4/2003 | Hosoe et al. | 428/664 |
| 7,087,290 B2 * | 8/2006 | Feist et al. | 428/141 |
| 2001/0022705 A1 | 9/2001 | Mori et al. | 360/135 |
| 2002/0173597 A1* | 11/2002 | Zarnoch et al. | 525/461 |

FOREIGN PATENT DOCUMENTS

| | | |
|---|---|---|
| CA | 2259483 | 1/1998 |
| DE | 4326296 A1 | 2/1994 |
| JP | 57049838 A | 3/1982 |
| JP | 57049838 A1 | 3/1982 |
| JP | 61-92814 | 5/1986 |
| JP | 61-105725 | 5/1986 |
| JP | 61-131232 | 6/1986 |
| JP | 61-242327 | 10/1986 |
| JP | 62-124625 | 6/1987 |
| JP | 62-134836 | 6/1987 |
| JP | 63-205817 | 8/1988 |
| JP | 63205817 | 8/1988 |
| JP | 2-96919 | 4/1990 |
| JP | 2-96921 | 4/1990 |
| JP | 6-4908 | 1/1994 |
| JP | 6-4916 | 1/1994 |
| JP | 6-12715 | 1/1994 |
| JP | 6-20316 | 1/1994 |
| JP | 06004908 A | 1/1994 |
| JP | 06004916 A | 1/1994 |
| JP | 06012715 A | 1/1994 |
| JP | 06020316 A | 1/1994 |
| JP | 06119668 A | 4/1994 |
| JP | 06150419 A | 5/1994 |
| JP | 06158281 A | 6/1994 |
| JP | 06162583 A | 6/1994 |
| JP | 6-187683 | 7/1994 |
| JP | 06187683 A | 7/1994 |
| JP | 06309714 A | 11/1994 |
| JP | 09237437 | 9/1997 |
| WO | WO 8706385 | 10/1987 |
| WO | WO 00/21689 | 2/2000 |
| WO | WO 00/00868 | 6/2000 |

OTHER PUBLICATIONS

Article titled "Viscosity of Linear Polyesters. An Exact Relationship between Viscosity and Chain Length", P. J. Flory.*
JPO Abstract Translation of JP 63-056832 A.*
English Language Translation of JP 63-056832 A (PTO 06-3716).*
English Language Translation of JP 63-13722 (PTO 06-3717).*
DATA Storage on Dec. 2, 1999, Article Date: May 1999, "Patterned media: Giant step in magnetic storage" (7 pages).
DATA Storage on Dec. 2, 1999, Article Date: Jan. 1999, "Magnetic Recording: the next 100 years" (10 pages).
Architecture of TeraStor's Near Field Recording Technology, http://209.24.93.3/tech_info, (8 pages).
"Facts About Near Field Recording", http://www.basis-gmbh.de, (2 pages).
"US HDD Makers Turn to 10-Gbit/Inch$^2$ Near Field Record", http://www.nikkeibp.com, (8 pages).
"Facts About Near Field Recording", http://209.24.93.3/tech_info. (3 pages).
"Thermoplastic Composites Reinforced With Melt Processable Glass", R.T. Young and D.G. Baird (5 pages).
Philips Research—Digital Video Recorder, http://www.research.philips.com/pressmedia/highlights (2 pages).
Maxell Device: DVD-RAM, http://www.maxell.co.jp/eng/device/dvd-ram/profile.html (2 pages).
AV & Development Center, http://www.pioneer.co.jp/crdl/av.htlm (1 page).
Near Field Recording—NFR, http://www.nswc.navv.mil/cosip/nov98 (5 pages).
Technical Info, http:///209.24.93.3/tech_info/backgrounder.html (3 pages).
Stragetic Partners Home, http://209.24.93.3/partners/index.html (1 page).
TeraStor, http://www.terastor.com/news/. (6 pages).
The era of giant magnetoresistive heads, http://www.storage.ibm.com/hardsoft/diskdrdl/technolo/gmr/. (16 pages).
Chp 3: Emerging Optical Storage Technologies, http://itri.loyola.edu/opto/c3_s5.htm (4 pgs.).
Chp 3: Optical Storage in the Future, http://itri.loyola. (2 pages).
Chp 3: Overview of Optical Storage Systems, http://itri.loyola.edu/ (4 pages).
Chp 3: Comparison of Japanese and U.S. R&D, http://itri.loyola.edu/ (1 page).
"Learning and Process Improvement during Production Ramp-Up", Christian Terwiesch and Roger E. Bohn, The Wharton School, University of California San Diego, Aug. 6, 1998 (33 pages).
"Magnetic Storage Research Aiming at High Areal Densities", R&D Magazine, Dec. 1998 (6 pages).
The WTEC High Density Data Storage Study, http://itri.loyola.edu/ (2 pages).
"Characterization of Magnetizing Process for Pre-Embossed Servo Pattern of Plastic Hard Disks", Shoji Tanaka et al., IEEE Transactions on Magnetics, vol. 30, No. 6, Nov. 1994 (3 pages).
Dispersed Concentration, David McKendrick, Report 98-03, Nov. 1998, http://www-irps.ucsd.edu/~sloan/papers (16 pages).
"Patterned Media: A Viable Route to 50 Gbit/in$^2$ and up for Magnetic Recording?", Robert J. White et al., IEEE Transactions on Magnetics, vol. 33, No. 1, Jan. 1997, p. 990-995.
DATA Storage on Dec. 2, 1999, Article Date: Sep. 1998, "Patterned media: 200 Gb/in2 or bust" (10 pages).
DATA Storage on Dec. 6, 1999, Article Date: Sep. 1997, "Patterned media promise superhigh storage densities" (10 pages).
"Recording Characteristics of Submicron Discrete Magnetic Tracks", S.E. Lambert et al., 1987 IEE, pp. 3690-3692.
"Direct nanoimprint of submicron organic light-emitting structures", Jian Wang et al, 1999 Appl. Phys. Lett., vol. 75, No. 18, Nov. 1, 1999, pp. 2767-2769.
"Lithographically induced self-construction of polymer microstructures for resistless patterning", Stephen Y. Chou et al., Appl. Phys. Lett., vol. 75, No. 7, Aug. 1999, p. 1004-1005.
Proposal to the Alfred P. Sloan Foundation from The Graduate School of International Relations and Pacific Studies and The Center For Magnetic Recording Research, Feb. 19, 1998, http://ww-irps.ucse.edu/~sloan/papers/sloanprop98.html (27 pages).
"Use of high performance resins for the planarization of magnetic rigid disk substrates", IEEE Transactions on Magnetics (Nov. 1991), vol. 27, No. 6, pt.2, p. 5175-7 (Abstract) (1 page).
Planarizing coating using PMR polyimides (magnetic recording discs), IBM Technical Disclosure Bulletin (Oct. 1982) vol. 25, No. 5, p. 2453-4 (Abstract).
"Nanoimprint lithography", Stephen Y. Chou et al., 1996 American Vacuum Society p. 4129-4133.
"Imprint of sub-25 nm vias and trenches in polymers", Stephen Y. Chou et al., 1995 American Institute of Physics, p. 3114-3116.
"Nano-compact disks with 400 Gbit/in$^2$ storage density fabricated using nanoimprint lithography and read with proximal probe", Peter R. Krauss et al, 1997 American Institute of Physics, p. 3174-3176.
Derwent Abstract, JP62124625A, Jun. 5, 1987.
JP361131232A. Abstract only. 2 pages.
JP362134836A. Abstract only. 2 pages.
JP361105725A. Abstract only. 2 pages.
Quantegy Professional Media, http://www.pncengineering.com/modSpec.,4pages.
Odian, George. Principles of Polymerization, Third Edition. John Wiley and Sons, 1991. pp. 150-162.

International Search Report; International Application No. PCT/US 03/06775; International Filing Date Jul. 3, 2003; Date of Mailing Jul. 24, 2003.

Derwent Abstract for JP 09237437.

Derwent Abstract for JP 63089335.

HTML document titled "Flexural Properties", copyright 1995-2004, (http://www.dow.com/styron/design/guide/flexural.htm), 1 pg.

"Magneto-optical properties of metaillc bilayer thin films"; Relm, W.; Weller, D.; Magnetics, IEEE Transactions on vol. 25, Issue 5, Sep. 1989; pp. 3762-3764.

JP57049838A; Narumiya et al; Vibration Load Applying Device; ABSTRACT only, one page.

\* cited by examiner

POLY(ARYLENE ETHER) DATA STORAGE MEDIA

CROSS REFERENCE TO RELATED APPLICATIONS

This application is a continuation-in-part application of U.S. patent application Ser. No. 09/683,114, filed Nov. 20, 2001 now abandoned, which is a continuation of and claims the benefit of the filing date of U.S. patent application Ser. No. 09/502,968, filed Feb. 11, 2000 now abandoned, which claims the benefit of the filing date of U.S. Provisional Application Ser. Nos. 60/120,101 filed Feb. 12, 1999, 60/134,585 filed May 17, 1999, 60/137,883 filed Jun. 7, 1999, 60/137,884 filed Jun. 7, 1999, and 60/146,248 filed Jul. 29, 1999, the entire contents of each application are hereby incorporated by reference.

BACKGROUND OF INVENTION

Optical, magnetic and magneto-optic media are primary sources of high performance storage technology that enable high storage capacity coupled with a reasonable price per megabyte of storage. Areal density, typically expressed as billions of bits per square inch of disk surface area (gigabits per square inch ($Gbits/in^2$)), is equivalent to the linear density (bits of information per inch of track) multiplied by the track density in tracks per inch. Improved areal density has been one of the key factors in the price reduction per megabyte, and further increases in areal density continue to be demanded by the industry.

In the area of optical storage, advances focus on access time, system volume, and competitive costing. Increasing areal density is being addressed by focusing on the diffraction limits of optics (using near-field optics), investigating three dimensional storage, investigating potential holographic recording met hods and other techniques.

Polymeric data storage media has been employed in areas such as compact disks (CD) and recordable or re-writable compact discs (e.g., CD-RW), and similar relatively low areal density devices, e.g. less than about 1 $Gbits/in^2$, which are typically read-through devices requiring the employment of a good optical quality substrate having low birefringence.

Referring to FIG. 1, a low areal density system i is illustrated having a read device 3 and a recordable or re-writable storage media 5. The storage media 5 comprises conventional layers, including a data layer 7, dielectric layers 9 and 9', reflective layer 11, and protective layer 13. During operation of the system 1, a laser 15 produced by the read device 3 is incident upon the optically clear substrate 17. The laser passes through the substrate 17, and through dielectric layer 9, the data layer 7 and a second dielectric layer 9'. The laser 15 then reflects off reflective layer 11, back through the dielectric layer 9', data layer 7, dielectric layer 9, and substrate 17 and then it is read by the read device 3.

Unlike the CD, storage media having high areal density capabilities, typically up to or greater than about 5 $Gbits/in^2$, employ first surface or near field read/write techniques in order to increase the areal density. For such storage media, although the optical quality of the substrate is not relevant, the physical and mechanical properties of the substrate become increasingly important. For high areal density applications, including first surface applications, the surface quality of the storage media can affect the accuracy of the reading device, the ability to store data, and replication qualities of the substrate. Furthermore, the physical characteristics of the storage media when in use can also affect the ability to store and retrieve data; i.e. the axial displacement of the media, if too great, can inhibit accurate retrieval of data and/or damage the read/write device.

The above issues associated with employing first surface, including near field, techniques have been addressed by utilizing metal, e.g., aluminum, and glass substrates. A disadvantage of using such substrates is the difficulty of creating a pattern, e.g., pit or groove structure, on the surface to facilitate tracking of the read/write device or definition of a sector structure. Once a pattern has been created on the surface, the desired layers are disposed upon the substrate using various techniques, such as, e.g., sputtering. Possible layers include reflective layers, dielectric layers, data storage layers and protective layers. In the case of magnetic or magneto-optic data storage devices, a patterned structure may also be added in the data layer through magnetic read/write techniques, resulting in decreased area available for data storage.

As is evident from the fast pace of the industry, the demand for greater storage capacities at lower prices, the desire to have re-writable discs, and the numerous techniques being investigated, further advances in the technology are constantly desired and sought. What is needed in the art are advances in storage media that enable storage media to be utilized in first surface, including near field, applications.

TECHNICAL FIELD

The present invention relates to data storage media, and especially relates to poly (arylene ether) data storage media.

SUMMARY OF INVENTION

Disclosed herein are data storage media as well as methods for making and processes for using the same. In one embodiment, the storage media comprises: a substrate comprising a plastic resin portion, wherein the plastic resin portion comprises poly(arylene ether) and a styrene material selected from the group consisting of polystyrene, styrenic copolymer(s), and reaction products and combinations comprising at least one of the foregoing styrene material(s), and a data layer on the substrate. The data layer can be at least partly read from, written to, or a combination thereof by an energy field. Additionally, when the energy field contacts the storage media, that can have a thickness of about 0.8 millimeters (mm) to about 2.5 mm, the energy field is incident upon the data layer before it could be incident upon the substrate.

In one embodiment, the method for retrieving data comprises: rotating the storage media, directing an energy field at the storage media such that the energy field is incident upon the data layer before it can be incident upon the substrate, and retrieving information from the data layer via the energy field.

Figure 1:
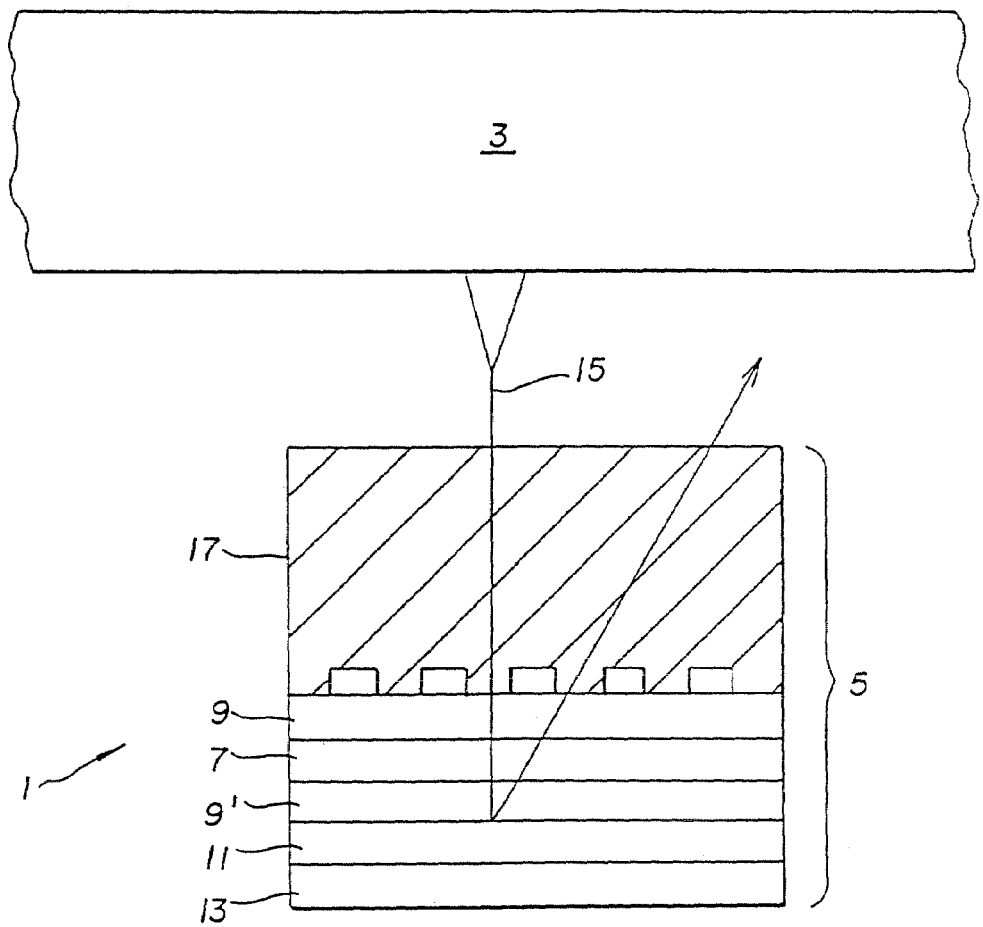
FIG. 1 is a cross-sectional illustration of a prior art low areal density system employing an optically clear substrate.

The above-described Figures are meant to be exemplary, not limiting, merely illustrating some of the potential embodiments of the present invention.

DETAILED DESCRIPTION

A storage media can comprise a homogenous or non-homogenous poly(arylene ether)/styrenic material substrate that can be formed in situ with the desired surface features disposed thereon on one or both sides, a data storage layer such as a magneto-optic material also on one or both sides, and an optional protective, dielectric, and/or reflective layers. The substrate can have a substantially homogenous, tapered, concave, or convex geometry, with various types and geometries of reinforcement employed to increase stiffness without adversely effecting surface integrity and smoothness.

The substrate can comprise a single phase blend of poly(arylene ether) (PAE) and a styrenic material comprising polystyrene (PS) and/or a styrenic copolymer(s) (e.g., styrene-co-acrylonitrile (SAN) and/or styrene-co-maleic anhydride (SMA)). In one embodiment, the storage media comprises PAE with a weight average molecular weight of about 5,000 to about 50,000 and polystyrene with a weight average molecular weight of about 10,000 to about 300,000, wherein all molecular weight herein is given in atomic mass units (AMU) unless otherwise specified. Preferably, less than or equal to about 20 wt % of the PAE has a weight average molecular weight ($M_w$) of less than or equal to about 15,000, with less than or equal to about 10 wt % preferred, and less than or equal to about 5 wt % especially preferred to obtain improvements in processability and to tailor mechanical properties. The axial displacement of the substrate should be sufficiently less than a tolerable system deflection distance in order to prevent damage to the read/write device and/or storage media surface during vibration and/or shock conditions. For example, for a disk (130 mm in outer diameter, 40 mm in inner diameter, and 1.2 mm in thickness) experiencing a sinusoidal gravitational loading of about 1 G, a resonant frequency of about 170 Hz, and a stand-off distance of about 0.051µ, an axial displacement in peak to peak measurement of less than about 250µ is preferred, with less than about 150µ more preferred, and less than about 125µ especially preferred for instances when damage to the substrate and/or the read/write device is a primary concern. Preferably, an axial displacement in peak to peak measurement of about 500µ or less, with about 250µ or less preferred, is maintained to a shock maximum of about 25 G's, with an about 2 to about 10 milliseconds (msec) application time and maintaining such a displacement to about 35 G's preferred. However, in other instances, e.g., those with a larger standoff distance (e.g., the about 0.30µ or more stand-off) damage to the head is not a dominating issue but rather, a very low axial displacement and/or disk tilt is preferred to allow for the optics to remain in focus since they may be incapable of responding to rapid changes in focal length. The maximum radial tilt and tangential tilt are independently, preferably, no more than about 1° each, and more preferably less than about 0.3° each, measured in a resting state (i.e., not spinning). Additionally, the overall thickness typically employed is about 0.8 mm to about 2.5 mm.

The composition can comprise less than or equal to about 90 wt % PAE and less than or equal to about 90 wt % styrenic material based on the total weight of the composition; with about 25 wt % to about 75 wt % PAE and about 25 wt % to about 75 wt % styrenic material preferred; and about 40 wt % to about 60 wt % PAE and about 40 wt % to about 60 wt % styrenic material especially preferred. Note also that the total content of the low molecular weight PAE (e.g., a weight average molecular weight of less than or equal to about 15,000, or an intrinsic viscosity (IV) of below about 0.25 deciliters per gram (dl/g) (as measured in chloroform at 25° C.)) is preferably less than or equal to about 20 wt %, with less than or equal to about 10 wt % especially preferred to prevent severe embrittlement of the material. In a ternary blend, the styrenic material can comprise about 1 wt % to about 99 wt % polystyrene and about 1 wt % to about 99 wt % styrenic copolymers, with about 25 wt % to about 90 wt % polystyrene and about 10 wt % to about 75 wt % styrenic copolymers preferred, and about 50 wt % to about 90 wt % polystyrene and about 10 wt % to about 50 wt % styrenic copolymers especially preferred, based upon the total weight of the styrenic material.

In embodiments where a styrenic copolymer is employed, the co-monomer content in the styrenic copolymer should be less than about 25 mole percent (mole %), in order to maintain a single-phase blend. Even at low co-monomer content, single phase blends are dependent upon the molecular weight of the PAE component and the co-monomer content. For example, for a PAE/SAN blend containing SAN with about 6 mole % acrylonitrile content, full miscibility is observed across all compositional ranges for PAE with an intrinsic viscosity IV of less than or equal to about 0.33 dl/g. If the acrylonitrile content is increased to about 8 mole %, then full miscibility is observed across all composition ranges only for low IV (e.g., 0.12 dl/g) PAE blends, whereas a higher IV material (e.g., greater than or equal to about 0.33 dl/g) exhibits immiscibility in the about 40 mole % to about 60 mole % PAE range.

Similarly, a ternary blend can be employed utilizing PPE, polystyrene and a styrenic copolymer. As above, full miscibility is observed in the case of 6 mole % acrylonitrile styrenic copolymers. For 8 mole % acrylonitrile, miscibility is observed when the SAN content is less than or equal to about 30 wt % or greater than or equal to about 70 wt %. The case of greater than or equal to 70 wt % SAN, however, results produces a blend possessing a low glass transition temperature (e.g., below about 130° C.).

The term poly(arylene ether) (PAE) includes polyphenylene ether (PPE) and poly (arylene ether) copolymers; graft copolymers; poly(arylene ether) ionomers; and block copolymers of alkenyl aromatic compounds, vinyl aromatic compounds, poly(arylene ether), and poly(arylene ether), and the like; and reaction products and combinations comprising at least one of the foregoing; and the like. Poly (arylene ether)s per se, are known polymers comprising a plurality of structural units of the formula (I):

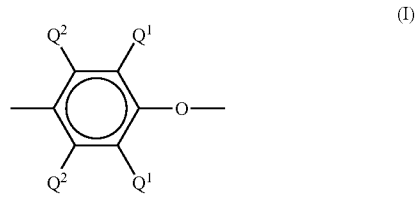

wherein for each structural unit, each $Q^1$ is independently halogen, primary or secondary lower alkyl (e.g., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Preferably, each $Q^1$ is alkyl or phenyl, especially $C_{1-4}$ alkyl, and each $Q^2$ is hydrogen.

Both homopolymer and copolymer poly(arylene ether) are included. The preferred homopolymers are those containing 2,6-dimethylphenylene ether units. Suitable copolymers include random copolymers containing, for example, such units in combination with 2,3,6-trimethyl-1,4-phenylene ether units or copolymers derived from copolymerization of 2,6-dimethylphenol with 2,3,6-trimethylphenol. Also included are poly(arylene ether) containing moieties prepared by grafting vinyl monomers or polymers such as polystyrenes, as well as coupled poly(arylene ether) in which coupling agents such as low molecular weight polycarbonates, quinones, heterocycles and formals undergo reaction in known manner with the hydroxy groups of two poly(arylene ether) chains to produce a higher molecular weight polymer. Poly (arylene ether)s further include reaction products and combinations comprising at least one of the above.

It will be apparent to those skilled in the art from the foregoing that the poly (arylene ether) contemplated include all those presently known, irrespective of variations in structural units or ancillary chemical features.

The poly(arylene ether) generally has an intrinsic viscosity (IV) of about 0.10 to about 0.60 deciliters per gram (dl/g) as measured in chloroform at 25° C. It is also possible to utilize a high intrinsic viscosity poly(arylene ether) (preferably greater than or equal to about 0.25 dl/g) and a low intrinsic viscosity poly(arylene ether) (preferably less than or equal to 0.25 dl/g) in combination. Determining an exact ratio, when two intrinsic viscosities are used, will depend somewhat on the exact intrinsic viscosities of the poly (arylene ether) used and the ultimate physical properties that are desired.

Suitable base titratable functionalized poly(arylene ether) resins include, but are not limited to, those prepared via reaction with an appropriate acid or anhydride functionalization agent. For example those prepared by melt reaction of poly(arylene ether) with alpha, beta unsaturated carbonyl compounds, including maleic anhydride, maleic acid, fumaric acid, citraconic anhydride, citraconic acid, itaconic anhydride, itaconic acid, aconitic anhydride, aconitic acid, and their esters and amines; alpha-hydroxy carbonyl compounds including carboxylic acids such as citric acid and maleic acid; derivatives of 5-hydroxybenzene-1,2,4-tricarboxylic anhydride, such as the 5-acetyl-derivative or a 4-ester-derivative such as the phenyl ester; trimellitic anhydride aryl esters, including trimellitic anhydride phenyl salicylate; and reaction products and combinations comprising at least one of the foregoing, among others, can be employed. Alternatively, poly(arylene ether) may be functionalized with acidic or latent acidic groups in a suitable solvent. Examples of such processes include metallation of poly(arylene ether) in tetrahydrofuran (THF) followed by quenching with carbon dioxide or capping of poly(arylene ether) in toluene solution with trimellitic anhydride acid chloride. Typically, less than or equal to about 10 wt % functionalization agent can be used (based on the weight of the poly phenylene ether and the agent), with less than or equal to about 6 wt % preferred, and about 1.5 wt % to about 4 wt % especially preferred.

In addition to the poly(arylene ether), one or more polystyrenes (PS) may be included in the composition. The term "polystyrene" as used herein includes polymers prepared by methods known in the art including bulk, suspension and emulsion polymerization, which contain at least 25 wt % of structural units derived from a monomer of the formula

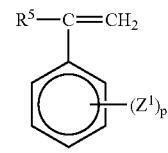

$Z^1$ is vinyl, halogen or lower alkyl; and p is from 0 to about 5.

Similarly in addition to the poly(arylene ether), one or more styrenic copolymers may be included in the composition in the described composition. The terms "polystyrene copolymer" and "styrenic copolymer" as used herein includes polymers prepared by methods known in the art including bulk, suspension and emulsion polymerization employing at least one monovinyl aromatic hydrocarbon. Examples of monovinyl aromatic hydrocarbons include alkyl-, cycloalkyl-, aryl-, alkylaryl-, aralkyl-, alkoxy-, aryloxy-, and other substituted vinylaromatic compounds, as well as reaction products and combinations comprising at least one of the foregoing. Specific examples include: styrene, 4-methylstyrene, 3,5-diethylstyrene, 4-n-propylstyrene, a-methylstyrene, a-methylvinyltoluene, a-chlorostyrene, a-bromostyrene, dichlorostyrene, dibromostyrene, tetrachlorostyrene, as well as reaction products and combinations comprising at least one of the foregoing styrenic copolymers. The preferred monovinyl aromatic hydrocarbons used are styrene and a-methylstyrene.

These polymers contain a co-monomer, such as acrylic monomers including acrylonitrile and substituted acrylonitrile, and acrylic acid esters, and/or maleic anhydride and derivatives thereof, e.g., maleimides, N-substituted maleimides, and the like. Specific examples of co-monomers include: acrylonitrile, ethacrylonitrile, methacrylonitrile, a-chloroarylonitrile, b-chloro-acrylonitrile, a-bromoacrylonitrile, b-bromoacrylonitrile, methyl acrylate, methyl methacrylate, ethyl acrylate, butyl acrylate, propylacrylate, isopropyl acrylate, maleic anhydride, methacrylonitrile, maleimide, N-alkyl maleimide, N-aryl maleimide or the alkyl or halo substituted N-arylmaleimides, as well as reaction products and combinations comprising at least one of the foregoing acrylic monomers. The preferred monomers are acrylonitrile, maleic anhydride, ethyl acrylate, and methyl methacrylate, with acrylonitrile and maleic anhydride especially preferred.

The amount of co-monomer(s) present in the polystyrene copolymer can vary. However, the level is generally present at a mole percentage of greater than or equal to about 2 mole %, and less than or equal to about 25 mole %, with about 4 mole % to about 15 mole % preferred, and about 6 mole % to about 10 mole % especially preferred. Especially preferred polystyrene copolymer resins include poly(styrene maleic anhydride), commonly referred to as "SMA" and poly(styrene acrylonitrile), commonly referred to as "SAN".

For the purposes of the present application, it is desirable that the styrenic copolymer remain in a single phase blend with the PAE component. As such, it is desirable that the copolymer be a random copolymer, versus a block type copolymer that would lead to phase separation.

Additionally, the blend may optionally also contain various additives, such as antioxidants, such as, for example, organophosphites, for example, tris(nonyl-phenyl) phosphite, tris(2,4-di-t-butylphenyl)phosphite, bis(2,4-di-t-butylphenyl) pentaerythritol diphosphite or distearyl pentaerythritol diphosphite; alkylated monophenols; polyphenols; alkylated reaction products of polyphenols with dienes, such as, for example, tetrakis[methylene(3,5-di-tert-butyl-4-hydroxyhydrocinnamate)] methane, 3,5 -di-tert-butyl-4-hydroxyhydrocinnamate octadecyl, 2,4-di-tert-butylphenyl phosphite; butylated reaction products of para-cresol and dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds, such as, for example, distearylthiodipropionate, dilaurylthiopropionate, and/or ditridecylthiodipropionate; amides of beta-(3, 5-di-tert-butyl-4-hydroxyphenyl)-propionic acid, and the like, as well as reaction products and combinations comprising at least one of the foregoing antioxidants.

Reinforcing agents, fillers, and other additives and the like, as well as reaction products and combinations comprising at least one of the foregoing may further be used to increase the modulus of the substrate. It is important, however, that the presence of a filler phase not adversely affect the surface quality of the molded part. As such, special processing conditions during injection molding may be required to ensure an adequately smooth surface when molding filled parts. Fillers and reinforcing agents, such as, for example, silicates, titanium dioxide ($TiO_2$), glass, zinc oxide (ZnO), zinc sulfide (ZnS), carbon black, graphite, calcium carbonate, talc, mica, and the like, as well as reaction products and combinations comprising at least one of the foregoing additives in the form of fibers (including continuous and chopped fibers), flakes, nanotubes, spheres, particles, and the like as well as combinations comprising at least one of the foregoing forms, may optionally be employed. Furthermore, other additives can also optionally be employed, such as, for example, mold release agents (pentaerythritol tetrastearate, glycerol monstearate, and the like); UV absorbers; stabilizers such as light and thermal stabilizers (acidic phosphorous-based compounds, hindered phenols, and the like; lubricants (mineral oil, and the like); plasticizers; dyes (quinines, azobenzenes, and the like); colorants, anti-static agents (tetra alkylammonium benzene sulfonate salts, tetra alkylphosphonium benzene sulfonate salts, and the like); anti-drip agents; among others, as well as reaction products and combinations comprising at least one of the foregoing additives.

The data storage media using this blend can be produced by first forming the thermoplastic composition using a conventional reaction vessel capable of adequately mixing the various components, such as a single or twin screw extruder, kneader, or the like. The components can either be simultaneously fed through a hopper into the extruder, or the styrenic material(s) can be introduced to the extruder and melted prior to the addition of the PAE to prevent sticking of the PAE. The extruder should be maintained at a sufficiently high temperature to melt the components without causing decomposition thereof. Temperatures of about 270° C. to about 340° C. can be used, with about 280° C. to about 320° C. preferred, and about 290° C. to about 305° C. especially preferred. Similarly, the residence time in the extruder should be controlled to minimize decomposition. Residence times of less than or equal to about 5 minutes (min) or more are typically employed, with less than or equal to about 2 min preferred, and less than or equal to about 1 min especially preferred.

Prior to extrusion into the desired form (typically pellets, sheet, web, or the like) the mixture can be filtered, such as by melt filtering and/or the use of a screen pack, or the like, to remove undesirable contaminants or decomposition products.

Once the composition has been produced, it can be formed into the data storage media, or any other desired article (films, lenses, sheets, etc.) using various molding and processing techniques. Possible molding techniques include injection molding, foaming processes, injection-compression, rotary molding, two shot molding, microcellular molding, film casting, extrusion, press molding, blow molding, and the like. If the composition is employed as a data storage media, for example, additional processing such as electroplating, coating techniques (spin coating, spray coating, vapor deposition, screen printing, painting, dipping, sputtering, vacuum deposition, electrodeposition, meniscus coating, and the like), lamination, data stamping, embossing, surface polishing, fixturing, and combinations comprising at least one of the foregoing processes, among others conventionally known in the art, may be employed to dispose desired layers on the PAE/styrenic material substrate. Essentially, the substrate may optionally be formed, in situ, with the desired surface features disposed thereon on one or both sides, a data storage layer such as a magneto-optic material also on one or both sides, and an optional protective, dielectric, and/or reflective layers. The substrate can have a substantially homogenous, tapered, concave, or convex geometry, with various types and geometries of reinforcement optionally employed to increase stiffness without adversely effecting surface integrity and smoothness.

An example of a PAE/styrenic material storage media comprises an injection molded PAE/styrenic material substrate that may optionally comprise a hollow (bubbles, cavity, and the like) or filler (metal, plastics, glass, ceramic, etc., in various forms such as fibers, spheres, etc.) core. Disposed on the substrate are various layers including: a data layer, dielectric layer(s), a reflective layer, and/or a protective layer. These layers comprise conventional materials and are disposed in accordance with the type of media produced. For example, for a first surface media, the layers may be protective layer, dielectric layer, data storage layer, dielectric layer, and then the reflective layer disposed in contact with the substrate.

The data storage layer(s) may comprise any material capable of storing retrievable data, such as an optical layer, magnetic layer, or a magneto-optic layer, having a thickness of less than or equal to about 600 Å, with a thickness less than or equal to about 300 Å preferred. Possible data storage layers include, but are not limited to, oxides (such as silicone oxide), rare earth element—transition metal alloy, nickel, cobalt, chromium, tantalum, platinum, terbium, gadolinium, iron, boron, others, and alloys and combinations comprising at least one of the foregoing, organic dye (e.g., cyanine or phthalocyanine type dyes), and inorganic phase change compounds (e.g., TeSeSn or InAgSb).

The protective layer(s), which protect against dust, oils, and other contaminants, can have a thickness of greater than or equal to about 100 µ to less than or equal to about 10 Å, with a thickness of less than or equal to about 300 Å preferred in some embodiments, and a thickness of less than or equal to about 100 Å especially preferred. The thickness of the protective layer(s) is usually determined, at least in part, by the type of read/write mechanism employed, e.g., magnetic, optic, or magneto-optic. Possible protective layers include anti-corrosive materials such as nitrides (e.g., silicon nitrides and aluminum nitrides, among others), carbides (e.g., silicon carbide and others), oxides (e.g., silicon dioxide and others), polymeric materials (e.g., polyacrylates or polycarbonates), carbon film (diamond, diamond-like carbon, etc.), among others, and reaction products and combinations comprising at least one of the foregoing.

The dielectric layer(s), which are disposed on one or both sides of the data storage layer and are often employed as heat controllers, can typically have a thickness of up to or exceeding about 1,000 Å and as low as about 200 Å. Possible dielectric layers include nitrides (e.g., silicon nitride, aluminum nitride, and others); oxides (e.g., aluminum oxide); carbides (e.g., silicon carbide); and alloys and combinations comprising at least one of the foregoing, among other materials compatible within the environment and preferably, not reactive with the surrounding layers.

The reflective layer(s) should have a sufficient thickness to reflect a sufficient amount of energy to enable data retrieval. Typically the reflective layer(s) can have a thickness of less than or equal to about 700 Å, with a thickness of about 300 Å to about 600 Å generally preferred. Possible reflective layers include any material capable of reflecting the particular energy field, including metals (e.g., aluminum, silver, gold, titanium, and alloys and combinations comprising at least one of the foregoing, and others). In addition to the data storage layer(s), dielectric layer(s), protective layer(s) and reflective layer(s), other layers can be employed such as lubrication layer and others. Useful lubricants include fluoro compounds, especially fluoro oils and greases, and the like.

The storage media described herein can be employed in conventional optic, magneto-optic, and magnetic systems, as well as in advanced systems requiring higher quality storage media and/or areal density. During use, the storage media is disposed in relation to a read/write device such that energy (magnetic, light, a combination thereof or another) contacts the data storage layer, in the form of an energy field incident on the storage media. The energy field contacts the layer(s) disposed on the storage media prior to (if ever) contacting the substrate. The energy field causes some physical or chemical change in the storage media so as to record the incidence of the energy at that point on the layer. For example, an incident magnetic field might change the orientation of magnetic domains within the layer, or an incident light beam could cause a phase transformation where the light heats the material.

Figure 2:
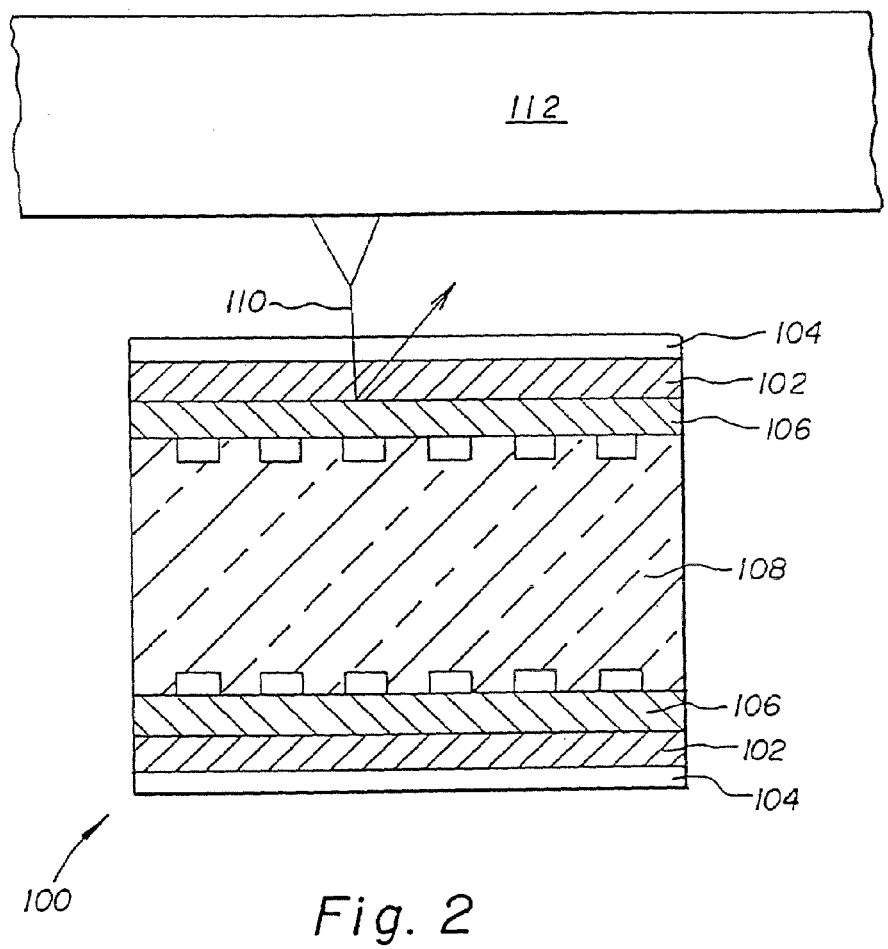
FIG. 2 is a cross-sectional illustration of a read/write system using one possible embodiment of a storage media of the present invention with a light incident on the data storage layer without passing through the substrate.

For example, referring to FIG. 2, in a magneto-optic system 100, data retrieval comprises contacting the data storage layer(s) 102 with a polarized light 110 (white light, laser light, or other) incident on such layer(s). A reflective layer 106, disposed between the data storage layer 102 and substrate 108, reflects the light back through the data storage layer 102, the protective layer 104, and to the read/write device 112 where the data is retrieved.

Figure 3:
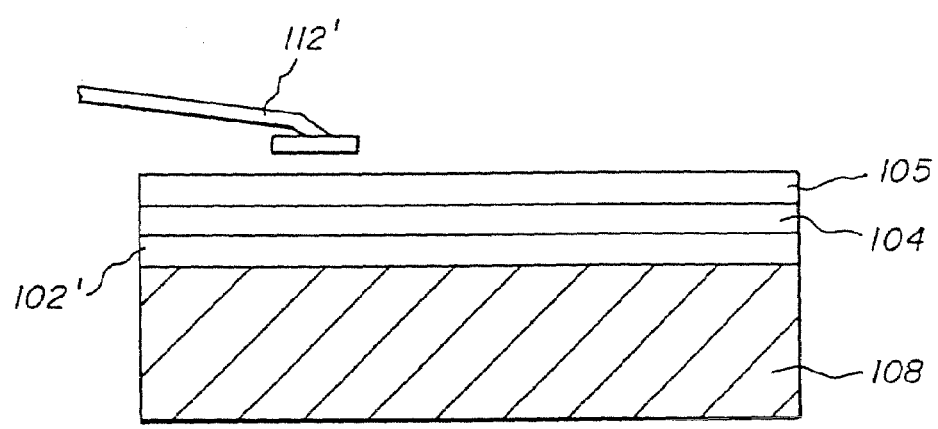
FIG. 3 is a cross-sectional illustration of one embodiment of a magnetic data storage substrate of the present invention.

In another embodiment, referring to FIG. 3, the read/write device 112 detects the polarity of magnetic domains in the disk storage layer 102' (i.e. data is read). To write data onto the storage media, a magnetic field is imposed onto the data storage layer 102' by the read/write device 112. The magnetic field passes from the read/write device 112', through the lubrication layer 105, and the protective layer 104 to the magnetic layer 102', forming magnetic domains aligned in either of two directions and thereby defining digital data bits.

In use, for example, data could be retrieved from the storage media by rotating the storage media (e.g., at speeds up to and exceeding about 10,000 revolutions per minute (rpm), with about 3,000 to about 10,000 rpm more typical, and about 5,000 to about 8,000 rpm most typical), directing an energy field at the storage media such that the energy field is incident upon the data layer before it can be incident upon the substrate, and retrieving information from the data layer via the energy field. This retrieval can comprise passing a portion or all of the energy field to the data layer, and passing at least a part or all of the portion of the energy field back from the data layer. Preferably, at least for near field applications, the energy field is incident upon the data storage layer without being incident upon the substrate.

Figure 4:
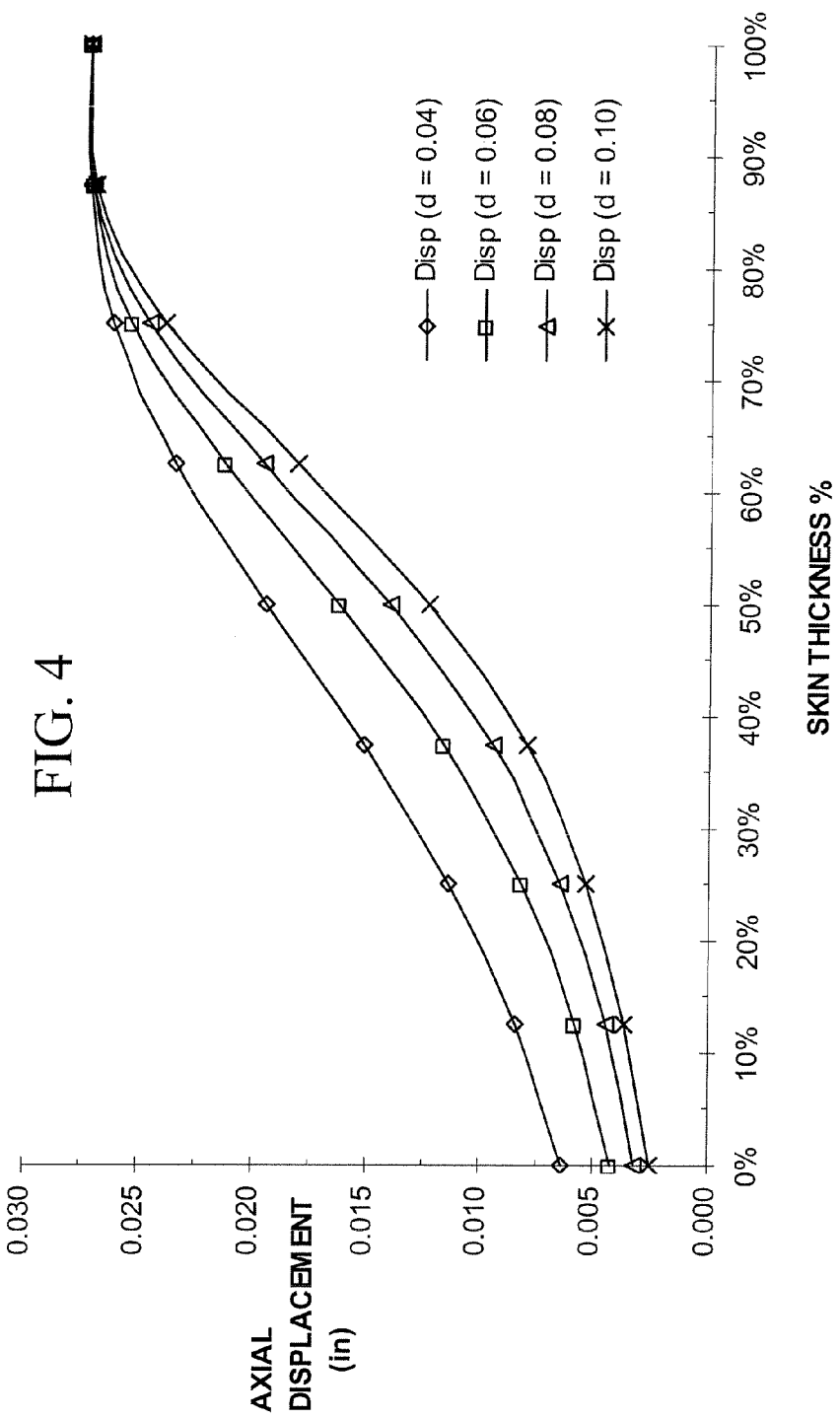
FIG. 4 is graph representing axial displacement peak to peak from vibration at the first fundamental frequency for a multi-layered composite (ABA co-injected disk) 130 mm outer diameter by 1.2 mm thickness disk having homogeneous layers of neat and reinforced polymer.

FIG. 4 represents the relationship between axial displacement for a 1 G sinusoidal vibration load for various material properties and fixed geometries. FIG. 4 shows the effects of axial displacement versus the skin thickness. For example, at a skin thickness of 100%, the axial displacement is 0.0272 inches (691 microns).

The following examples are provided to further illustrate the present invention and not to limit the scope hereof.

EXAMPLE 1

Poly(phenylene ether)/polystyrene

A blend of 80 wt % 0.33 IV poly(phenylene ether) powder (Noryl® poly(phenylene ether) resin commercially available from GE Plastics) and 20 wt % polystyrene pellets (Nova PS172 commercially available from Nova Chemical) was extruded in a 40 mm twin screw extruder to make homogeneous, single phase pellets. The resulting pellets were then injection molded to form an optical disk with a grooved surface, with the groove depth of the mold insert ("stamper") being approximately 50 nm (nanometers) deep and a track pitch of approximately 0.8 microns (µ). The glass transition temperature (Tg) of the material was about 182° C. The disk exhibits improved flatness, lower density, and lower moisture absorption than a typical optical quality polycarbonate disk as in Comparative Example #1.

EXAMPLE 2

Poly(phenylene ether)/polystyrene

A blend of 60 wt % 0.33 IV poly(phenylene ether) powder (commercially available from GE Plastics) and 40 wt % polystyrene pellets (Nova PS172) was extruded in a 40 mm twin screw extruder to make homogeneous, single phase pellets. The resulting pellets were then injection molded to form an optical disk with a grooved surface, with the groove depth of the mold insert ("stamper") being approximately 50 nm deep and a track pitch of approximately 0.8 µ. Tg of the material was about 158° C. This material showed superior replication of the grooved structure compared to the blends containing higher poly(phenylene ether) content. The ductility of the material (as measured by Notched Izod, Dynatup, or other impact-type methods) was superior to that of blends containing higher polystyrene content. The disk exhibits improved flatness, lower density, and lower moisture absorption than a typical optical quality polycarbonate disk as in Comparative Example 1.

EXAMPLE 3

Poly(phenylene ether)/polystyrene

A blend of 25 wt % 0.33 IV poly(phenylene ether) powder (commercially available from GE Plastics) and 75 wt % polystyrene pellets (Nova PS172) was extruded in a 40 mm twin screw extruder to make homogeneous, single phase pellets. The resulting pellets were then injection molded to form an optical disk. Tg of the material was about 124° C. While the flow and replication of this material were superior to that of the higher poly(phenylene ether) content blends, the ductility and Tg are significantly lower. The disk exhibits improved flatness, lower density, and lower moisture absorption than a typical optical quality polycarbonate disk as in Comparative Example 1.

EXAMPLE 4

Poly(phenylene ether)/poly(phenylene ether)/polystyrene

A blend of 50 wt % 0.33 IV poly(phenylene ether) powder (commercially available from GE Plastics), 5 wt % 0.12 IV poly(phenylene ether) powder, and 45 wt % polystyrene pellets (Nova PS172) was extruded in a 40 mm twin screw extruder to make homogeneous, single phase pellets. The resulting pellets were then injection molded to form an optical disk with a grooved surface, with the groove depth of the mold insert ("stamper") being approximately 50 nm deep and a track pitch of approximately 0.8 µ. Tg of the material was about 155° C. The material showed superior flow compared to a blend which contains 55 wt % 0.33 IV poly(phenylene ether) without any significant sacrifice in ductility. The disk exhibited improved flatness, lower density, and lower moisture absorption than a typical optical quality polycarbonate disk as in Comparative Example 1.

EXAMPLE 5

Poly(phenylene ether)/SAN Blend

A blend of 75 wt % 0.33 IV poly(phenylene ether) powder (commercially available from GE Plastics) and 25 wt % SAN powder (7.6 mole % AN content; GE Plastics) was extruded in a 16 mm twin screw extruder to make homogeneous, single phase pellets. Tg of the material was about 166° C. The material exhibited improved modulus, lower density, and lower moisture absorption than a typical optical quality polycarbonate material as in Comparative Example 1.

EXAMPLE 6

Poly(phenylene ether)/SAN Blend

A blend of 75 wt % 0.33 IV poly(phenylene ether) powder (GE Plastics) and 25 wt % SAN powder (6.3 mole % AN content; GE Plastics) was extruded in a 16 mm twin screw extruder to make homogeneous, single phase pellets. Tg of the material was about 166° C. The material exhibited improved modulus, lower density, and lower moisture absorption than a typical optical quality polycarbonate material as in Comparative Example 1.

EXAMPLE 7

Poly(phenylene ether)/SAN Blend

A blend of 50 wt % 0.33 IV poly(phenylene ether) powder (commercially available from GE Plastics) and 50 wt % SAN powder (6.3 mole % AN content; commercially available from GE Plastics) was extruded in a 16 mm twin screw extruder. In contrast to Comparative Example 2, this composition forms a single phase blend. Tg of the material was about 141° C. The material exhibited improved modulus, lower density, and lower moisture absorption than a typical optical quality polycarbonate material as in Comparative Example 1.

EXAMPLE 8

Poly(phenylene ether)/polystyrene/SAN Blend

A blend of 56 wt % 0.33 IV poly(phenylene ether) powder (commercially available from GE Plastics), 19 wt % polystyrene powder (Nova PS172), and 25 wt % SAN powder (6.3 mole % AN content; commercially available from GE Plastics) was extruded in a 16 mm twin screw extruder to make homogeneous, single phase pellets. Tg of the material was about 153° C. The material exhibited improved modulus, lower density, and lower moisture absorption than a typical optical quality polycarbonate material as in Comparative Example 1.

COMPARATIVE EXAMPLE 1

Polycarbonate (PC)

The properties of the above materials and molded articles can be compared to those of a typical optical quality polycarbonate (e.g., OQ1020C, commercially available from GE Plastics). Pellets were made by extrusion of PC powder under standard conditions, and disks were made by injection molding under conventional injection molding conditions for data storage disks. Tg of the PC was about 140-145° C., with a heat distribution temperature (HDT) of about 127° C.

COMPARATIVE EXAMPLE 2

Poly(phenylene ether)/SAN Blend

A blend of 50 wt % 0.33 IV poly(phenylene ether) powder (commercially available from GE Plastics) and 50 wt % SAN powder (7.6 mole % AN content; commercially available from GE Plastics) was extruded in a 16 mm twin screw extruder. The resulting product was not single phase, demonstrating two glass transition temperatures of about 106 and about 198° C. The material was not deemed useful for the application, as parts molded from this blend do not show adequate surface quality (smoothness).

The PAE thermoplastic compositions possess improved properties compared to polycarbonate, and to pure polystyrene or styrenic copolymers. For example the density and flexural modulus of a 50/50 PAE/styrenic material single phase blend is 1.07 grams per cubic centimeter (g/cc) and 440 kilo pounds per square inch (Kpsi), respectively, while for PC they are 1.23 g/cc and 330 Kpsi, respectively. Consequently, these compositions are useful in numerous applications, particularly, data storage media (optical, magnetic, magneto-optic, and the like).

Additionally, the PAE compositions exhibited reduced moisture absorption compared to conventional materials, e.g., a moisture absorption of less than or equal to about 0.20 wt %, with less than or equal to about 0.15 wt % typical, and less than or equal to about 0.10 wt % preferred, wherein moisture absorption is equilibrium water uptake when the sample is held at 85° C. and 85 wt % relative humidity. For example, the polycarbonate equilibrium moisture uptake was about 0.25 to about 0.35 wt %, while that of PAE/styrenic material is about 0.06 wt % This is desirable because moisture absorption can cause dimensional stability problems when the disk is moved from wet to dry (or vice versa) environments.

Unlike other storage media, the PAE storage media disclosed herein employs a substrate having at least a portion thereof plastic (e.g., at least a thin plastic film) to attain the desired mechanical properties and surface features. Due to the use of the plastic, in situ formation of the substrate with the desired surface features is possible. Furthermore, surface features, including servo-patterning (e.g., pits, grooves, and the like), asperities (e.g., laser bumps, and the like), protrusions, edge features, roughness, smoothness, microwaviness, and flatness etc., can be embossed directly into the substrate surface, rendering production of this storage media cost effective. The substrate can have a substantially homogenous, tapered, concave, or convex geometry, with various types and geometries of reinforcement employed to increase stiffness without adversely effecting surface integrity and smoothness.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A storage media for data, comprising:
   a substrate having a thickness of less than or equal to 1.2 mm and an axial displacement of less than or equal to 691μ under a 1 G sinusoidal vibration load, and comprising a single phase plastic resin portion, wherein the plastic resin portion comprises poly(arylene ether) and a styrene material selected from the group consisting of polystyrene, styrenic copolymer(s), and reaction products and combinations comprising at least one of the foregoing styrene material(s); and
   a data layer on the substrate;
   wherein the data layer can be at least partly read from, written to, or a combination thereof by an energy field; and
   wherein, when the energy field contacts the storage media, the energy field is incident upon the data layer before it could be incident upon the substrate.

2. The storage media as in claim 1, further comprising surface features selected from the group consisting of servo-patterning, edge features, asperities, and combinations comprising at least one of the foregoing surface features.

3. The storage media of claim 1, wherein the poly(arylene ether) has a weight average molecular weight of about 5,000 to about 50,000 AMU, and the polystyrene has a weight average molecular weight of about 10,000 to about 300,000 AMU.

4. The storage media of claim 3, wherein less than or equal to about 20 wt % of the poly(arylene ether) has a weight average molecular weight of less than or equal to about 15,000 AMU.

5. The storage media of claim 4, wherein less than or equal to about 10 wt % of the poly(arylene ether) has a weight average molecular weight of less than or equal to about 15,000 AMU.

6. The storage media of claim 5, wherein less than or equal to about 5 wt % of the poly(arylene ether) has a weight average molecular weight of less than or equal to about 15,000 AMU.

7. The storage media of claim 1, wherein the plastic resin portion further comprises less than or equal to about 90 wt % poly(arylene ether) and less than or equal to about 90 wt % styrene material, based on the total weight of the plastic resin portion.

8. The storage media of claim 7, wherein the plastic resin portion further comprises about 25 wt % to about 75 wt % poly(arylene ether) and about 25 wt % to about 75 wt % styrene material, based on the total weight of the plastic resin portion.

9. The storage media of claim 8, wherein the plastic resin portion further comprises about 40 wt % to about 60 wt % poly(arylene ether) and about 40 wt % to about 60 wt % styrene material, based on the total weight of the plastic resin portion.

10. The storage media of claim 1, wherein the styrene material comprises the styrenic copolymer, and wherein the styrenic copolymer is prepared by bulk, suspension or emulsion polymerization using a monovinyl aromatic hydrocarbon selected from the group consisting of alkyl-, cycloalkyl-, aryl-, alkylaryl-, aralkyl-, alkoxy-, aryloxy-, and reaction products and combinations comprising at least one of the foregoing monovinyl aromatic hydrocarbon.

11. The storage media as in claim 10, wherein the hydrocarbon is selected from the group consisting of styrene, 4-methylstyrene, 3,5-diethylstyrene, 4-n-propylstyrene, a-methylstyrene, a-methylvinyltoluene, a-chlorostyrene, a-bromostyrene, dichlorostyrene, dibromostyrene, tetrachlorostyrene, and combinations comprising at least one of the foregoing hydrocarbons.

12. The storage media of claim 1, wherein the styrene material comprises the styrenic copolymer, and wherein the styrenic copolymer has less than or equal to about 25 mole % co-monomer.

13. The storage media of claim 12, wherein the styrenic copolymer has about 4 mole % to about 15 mole % co-monomer.

14. The storage media of claim 13, wherein the styrenic copolymer has about 6 mole % to about 10 mole % co-monomer.

15. The storage media of claim 12, wherein the co-monomer is selected from the group consisting of acrylonitrile, maleic anhydride, and reaction products and combinations comprising at least one of the foregoing co-monomers.

16. The storage media of claim 1, further comprising an additive selected from the group consisting of silicates, titanium dioxide, glass, zinc oxide, zinc sulfide, carbon black, graphite, calcium carbonate, talc, mica, and reaction products and combinations comprising at least one of the foregoing additives.

17. The storage media of claim 16, wherein the additives are in a form selected from the group consisting of continuous fibers, chopped fibers, flakes, nanotubes, spheres, particles, and combinations comprising at least one of the foregoing forms.

18. The storage media of claim 1, further comprising an additive selected from the group consisting of mold release agent(s), UV absorber(s), light stabilizer(s), thermal stabilizer(s), lubricant(s), plasticizer(s), dye(s), colorant(s), anti-static agent(s), anti-drip agent(s), and reaction products and combinations comprising at least one of the foregoing additives.

19. The storage media of claim 1, wherein the styrene material comprises about 25 wt % to about 90 wt % polystyrene and about 10 wt % to about 75 wt % styrenic copolymers, based upon the total weight of the styrene material.

20. The storage media of claim 19, wherein the styrene material further comprises about 50 wt % to about 90 wt % polystyrene and about 10 wt % to about 50 wt % styrenic copolymers, based upon the total weight of the styrene material.

21. The storage media of claim 1, wherein the poly (arylene ether) has an intrinsic viscosity of about 0.10 to about 0.60 dl/g measured in chloroform at 25° C.

22. The storage media of claim 1, further comprising a maximum radial tilt of less than about 1°, measured in a resting state.

23. The storage media of claim 22, wherein the radial tilt is less than about 0.3°, measured in a resting state.

24. A storage media for data, the media comprising:
a substrate having a thickness of less than or equal to 1.2 mm and an axial displacement of less than or equal to 691μ under a 1 G sinusoidal vibration load, and comprising a single phase plastic resin portion, wherein the plastic resin portion consists essentially of poly(arylene ether) and a styrene material selected from the group consisting of polystyrene, styrenic copolymer(s), and reaction products and combinations comprising at least one of the foregoing styrene material(s); and
a data layer on the substrate;
wherein the data layer can be at least partly read from, written to, or a combination thereof by an energy field; and
wherein, when the energy field contacts the storage media, the energy field is incident upon the data layer before it could be incident upon the substrate.

25. The storage media of claim 24, wherein less than or equal to about 20 wt % of the poly(arylene ether) has a weight average molecular weight of less than or equal to about 15,000 AMU.

26. The storage media of claim 25, wherein less than or equal to about 10 wt % of the poly(arylene ether) has a weight average molecular weight of less than or equal to about 15,000 AMU.

27. The storage media of claim 26, wherein less than or equal to about 5 wt % of the poly(arylene ether) has a weight average molecular weight of less than or equal to about 15,000 AMU.

28. The storage media of claim 24, wherein the styrene material comprises the styrene copolymer, and wherein the styrenic copolymer has less than or equal to about 25 mole % co-monomer.

29. The storage media of claim 28, wherein the styrenic copolymer has about 4 mole % to about 15 mole % co-monomer.

30. The storage media of claim 29, wherein the styrenic copolymer has about 6 mole % to about 10 mole % co-monomer.

31. The storage media of claim 24, wherein the poly (arylene ether) has an intrinsic viscosity of about 0.10 to about 0.60 dl/g measured in chloroform at 25° C.

32. A method for retrieving data, comprising:
rotating a storage media having a substrate, the substrate having a thickness of less than or equal to 1.2 mm and an axial displacement of less than or equal to 691μ under a 1 G sinusoidal vibration load, and comprising a single phase plastic resin portion and a data layer disposed on a surface of the substrate, wherein the plastic resin portion comprises poly(arylene ether) and a styrene material selected from the group consisting of polystyrene, styrenic copolymer(s), and reaction products and combinations comprising at least one of the foregoing styrene material(s);
directing an energy field at the storage media such that the energy field is incident upon the data layer before it can be incident upon the substrate; and
retrieving information from the data layer via the energy field.

33. The method for retrieving data as in claim 32, further comprising passing at least a portion of the energy field to the data layer, and passing at least a part of the portion of the energy field back from the data layer.

34. The method for retrieving data as in claim 32, wherein the energy field is incident upon the data storage layer without being incident upon the substrate.

35. The method for retrieving data as in claim 32, wherein less than or equal to about 10 wt % of the poly(arylene ether) has a weight average molecular weight of less than or equal to about 15,000 AMU.

36. The method for retrieving data as in claim 35, wherein less than or equal to about 5 wt % of the poly(arylene ether) has a weight average molecular weight of less than or equal to about 15,000 AMU.

37. The method for retrieving data as in claim 32, wherein the styrene material comprises the styrenic copolymer, and wherein the styrenic copolymer has about 4 mole % to about 15 mole % co-monomer.

38. The method for retrieving data as in claim 37, wherein the styrenic copolymer has about 6 mole % to about 10 mole % co-monomer.

39. The method for retrieving data as in claim 32, wherein the poly(arylene ether) has an intrinsic viscosity of about 0.10 to about 0.60 dl/g measured in chloroform at 25° C.

40. An optical disk, comprising:
a substrate having a thickness of less than or equal to 1.2 mm and an axial displacement of less than or equal to 691μ under a 1 G sinusoidal vibration load, and comprising a single phase plastic resin portion, wherein the plastic resin portion comprises poly(arylene ether) and a styrene material selected from the group consisting of polystyrene, styrenic copolymer(s), and reaction products and combinations comprising at least one of the foregoing styrene material(s); and
a data layer on the substrate;
wherein the data layer can be at least partly read from, written to, or a combination thereof by a light; and
wherein, when the light contacts the storage media, the light is incident upon the data layer before it could be incident upon the substrate.

41. A storage media for data, comprising:
a substrate having a thickness of less than or equal to 1.2 mm and an axial displacement of less than or equal to 691μ under a 1 G sinusoidal vibration load, and comprising a single phase plastic resin portion, wherein the plastic resin portion comprises poly(arylene ether) and polystyrene; and
a data layer on the substrate;
wherein the data layer can be at least partly read from, written to, or a combination thereof by an energy field; and
wherein, when the energy field contacts the storage media, the energy field is incident upon the data layer before it could be incident upon the substrate.

* * * * *